United States Patent
Ji et al.

(10) Patent No.: US 7,647,390 B2
(45) Date of Patent: Jan. 12, 2010

(54) AUTOMATIC INTERNET ACCESS METHOD USING DIGITAL SUBSCRIBER LINE

(75) Inventors: Sung-Keun Ji, Songnam-shi (KR); Kwang-Gil Sun, Suwon-shi (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 759 days.

(21) Appl. No.: 10/242,402

(22) Filed: Sep. 13, 2002

(65) Prior Publication Data

US 2003/0055987 A1   Mar. 20, 2003

(30) Foreign Application Priority Data

Sep. 15, 2001   (KR) ........................... 2001-0057041

(51) Int. Cl.
G06F 15/177 (2006.01)
G06F 15/16 (2006.01)

(52) U.S. Cl. .................. 709/222; 709/220; 709/227

(58) Field of Classification Search .............. 709/227, 709/220, 222
See application file for complete search history.

(56) References Cited

U.S. PATENT DOCUMENTS

| | | | | |
|---|---|---|---|---|
| 5,568,402 A | * | 10/1996 | Gray et al. | 709/224 |
| 5,970,088 A | * | 10/1999 | Chen | 375/222 |
| 5,987,061 A | * | 11/1999 | Chen | 375/222 |
| 5,999,563 A | * | 12/1999 | Polley et al. | 375/222 |
| 6,012,088 A | * | 1/2000 | Li et al. | 709/219 |
| 6,338,064 B1 | * | 1/2002 | Ault et al. | 707/9 |

(Continued)

FOREIGN PATENT DOCUMENTS

KR   10-2001-0064883   7/2001

OTHER PUBLICATIONS

W. Simpson, Request for Comments (TFC): 1661, *The Point-to-Point Protocol (PPP)*, Jul. 1994 http://www.ietf.org/rfc/rfc1661.txt.

(Continued)

*Primary Examiner*—Nathan J. Flynn
*Assistant Examiner*—Chirag R Patel
(74) *Attorney, Agent, or Firm*—Robert E. Bushnell, Esq.

(57) ABSTRACT

An automatic Internet access method using a digital subscriber line includes: upon receiving an automatic Internet access program install request from a user, installing a PPPoE device driver including a PPPoE adapter and an NDISWAN (Network Driver Interface Specification Wide Area Network) miniport driver, and an ADSL monitoring tool which is an application program for informing the user whether ADSL (Asynchronous Digital Subscriber Line) is connected, in a user PC; upon power on of the user PC, attempting automatic Internet access by the PPPoE device driver on WINDOWS™ over a device driver, and interposing between TCP/IP and the PPPoE device driver a PPP/PPPoE module for informing the user of a current connection state through the ADSL monitoring tool under the control of the device driver; receiving a user ID and a password input by the user through a user interface while installing the PPPoE device driver in the user PC, and storing the received user ID and password in a registry; and upon power on of the user PC, attaining by the device driver user authentication from a NAS server on the Internet using the user ID and the password stored in the registry, and performing Internet access.

20 Claims, 10 Drawing Sheets

U.S. PATENT DOCUMENTS

| | | | |
|---|---|---|---|
| 6,643,815 B1 * | 11/2003 | Davis et al. | 714/758 |
| 6,711,162 B1 * | 3/2004 | Ortega et al. | 370/389 |
| 6,754,722 B2 * | 6/2004 | Herzi | 710/8 |
| 6,950,949 B1 * | 9/2005 | Gilchrist | 726/19 |
| 7,028,084 B1 * | 4/2006 | Horton | 709/224 |
| 7,047,304 B2 * | 5/2006 | Senapati et al. | 709/229 |
| 7,088,737 B1 * | 8/2006 | Carrel | 370/469 |
| 7,406,085 B2 | 7/2008 | Hadjiahmad | |
| 2001/0036192 A1 * | 11/2001 | Chiles et al. | 370/401 |
| 2001/0055017 A1 * | 12/2001 | Ording | 345/440 |
| 2002/0004935 A1 * | 1/2002 | Huotari et al. | 717/11 |
| 2002/0010818 A1 * | 1/2002 | Wei et al. | 710/62 |
| 2002/0082927 A1 * | 6/2002 | Borenstein et al. | 705/21 |
| 2002/0141385 A1 * | 10/2002 | Wasik et al. | 370/352 |
| 2003/0039268 A1 * | 2/2003 | Chong et al. | 370/466 |
| 2003/0055990 A1 * | 3/2003 | Cheline et al. | 709/229 |

OTHER PUBLICATIONS

L. Mamakos et al., Request for Comments (RFC): 2516, *Transmitting PPP Over Ethernert*, Feb. 1999 http://www.faqs.org/rfcs/rfc2516.html.

G. Gross et al., Request for Comments (RFC): 2364, *PPP Over AAL5*, Jul. 1998 http://www.faqs.org/rfcs/rfc2364.html.

http://en.wikipedia.org/wiki/End-toend_connectivity.

* cited by examiner

AUTOMATIC INTERNET ACCESS METHOD USING DIGITAL SUBSCRIBER LINE

CLAIM OF PRIORITY

This application makes reference to, incorporates the same herein, and claims all benefits accruing under 35 U.S.C. § 119 from an application for INTERNET AUTOMATIC CONNECTION METHOD USING DIGITAL SUBSCRIBER LINE earlier filed in the Korean Industrial Property Office on 15 Sep. 2001 and there duly assigned Serial No. 2001-57041.

BACKGROUND OF THE INVENTION

1. Field of the Invention

The present invention relates generally to a transmission system, and in particular, to an automatic Internet access method using a digital subscriber line.

2. Description of the Related Art

An xDSL (x-Digital Subscriber Line) technology is used to provide a high-speed data service using an existing telephone line. Major xDSLs include ADSL (Asymmetrical DSL), UADSL (Universal Asymmetrical DSL), HDSL (High bit rate DSL), SDSL (Symmetrical DSL), MSDSL (Multirate Symmetrical DSL), RADSL (Rate Adaptive DSL), IDSL (ISDN (Integrated services digital network) like DSL), and VDSL (Very high DSL).

The ADSL transmits both a high-speed data service and a standard voice service through a twisted-pair copper wire. The ADSL is characterized by providing the high-speed data communication service as well as the existing telephone service, using the existing telephone line and telephone set. However, the existing modem cannot be used for both the telephone service and the data communication service. The ISDN, though it can be used for both the telephone service and the data communication service, decreases in a data rate to the half. In contrast, the ADSL uses a low frequency for the telephone service and a high frequency for the data communication service on a single telephone line, thus preventing interference and securing a data rate. The ADSL is called an asymmetrical digital subscriber line, because a data rate of a forward signal from a telephone office to a subscriber is different from a data rate of a reverse signal from the subscriber to the telephone office. Compared with the existing CATV (Cable Television) in which a forward data rate is identical to a reverse data rate and the high-speed data communication service can be supported, the ADSL is disadvantageous in that its data rate is 1/3 times lower than the data rate of the CATV. However, the ADSL is advantageous in that the data rate is constant regardless of an increase in number of the subscribers. Each subscriber can transmit data at a data rate of up to 12 Mbps (bits per second). Due to this advantage, the ADSL is generally used for the high-speed data service.

However, Internet access using the ADSL has the following problems.

First, Internet access using the ADSL depends upon the type of a modem in use. That is, an internal modem uses PPPoA (Point-to-Point Protocol over Asynchronous transfer mode) and an external modem uses PPPoE (Point-to-Point Protocol over Ethernet). Thus, the internal modem must use a telephone connection adapter (or a PPP (Point-to-Point) module basically provided in WINDOWS™ for PPP communication) in a personal computer (PC), and the external modem must use a WinPoET connection program, an NTS connection program or other connection programs.

Second, the modems have different installation methods according to their types, so it is difficult to maintain and repair the modems after installation. In the case of internal modems, each modem has a unique installation driver, so a driver proper to an operating system of the user PC must be installed during installation of the modem. After installation, an operation of linking the installed internal driver to a telephone connection adapter of the user PC must be performed. In the case of external modems, a connection program used is different depending upon an operating system of the user PC. After the external modem is installed, a PPPoE server should be searched and registered in a connection window of the user PC, for proper connection. Accordingly, the installation time is increased and the installation method is complicated. When the PPPoE server name is incorrect or a proper server name cannot be found, the modem must be reinstalled.

Third, in many cases, the Internet access using the ADSL has operation trouble due to mis-operation of a connection program by the user. According to statistics, the failure due to the mis-operation by the user accounts for 40% of the total computer failure. In the case of the external modem, the user is allowed to manipulate the connection program, causing a frequent failure due to mis-manipulation by the user. In the case of the internal modem, the user may wrongly manipulate the telephone connection adapter while using the user PC. The telephone connection adapter is a module which is installed separately from a modem device deriver. If the user, not knowing that the telephone connection adapter is used for ADSL connection, mistakenly uninstalls the telephone connection adapter module or changes the set value, the ADSL communication will get into trouble.

Fourth, an Internet access program using the ADSL requires an excessive connection time, and the user must input his or her ID (identification) and password at each access.

SUMMARY OF THE INVENTION

It is, therefore, an object of the present invention to provide an Internet access method for reducing the number of steps of accessing the Internet in a high-speed data service, using the existing telephone line.

It is another object of the present invention to provide an Internet access method using common ADSL connection.

It is further another object of the present invention to provide an Internet access method for reducing the frequency of failures due to mis-manipulation by a user.

To achieve the above and other objects, there is provided an automatic Internet access method using a digital subscriber line. The method includes the steps of: upon receiving an automatic Internet access program install request from a user, installing a PPPoE device driver including a PPPoE adapter and an NDISWAN (Network Driver Interface Specification Wide Area Network) miniport driver, and an ADSL monitoring tool which is an application program for informing the user whether ADSL is connected, in a user PC; upon power on of the user PC, attempting automatic Internet access by the PPPoE device driver on WINDOWS™ over a device driver, and interposing between TCP/IP (Transmission Control Protocol/Internet Protocol) and the PPPoE device driver a PPP/PPPoE module for informing the user of a current connection state through the ADSL monitoring tool under the control of the device driver; receiving a user ID and a password input by the user through a user interface while installing the PPPoE device driver in the user PC, and storing the received user ID and password in a registry; and upon power on of the user PC, attaining by the device driver user authentication from a NAS (Network Attached Storage) server on the Internet using the user ID and the password stored in the registry, and performing Internet access.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

In the embodiment of the present invention, the ADSL connection techniques conventionally separated for an internal modem and an external modem are united into a common PPPoE connection technique, regardless of the internal modem and the external modem. In addition, the conventional multiple steps of accessing the Internet are reduced to a single step, so the user can access the Internet as soon as the user PC is powered up, like in the private line.

Figure 1:
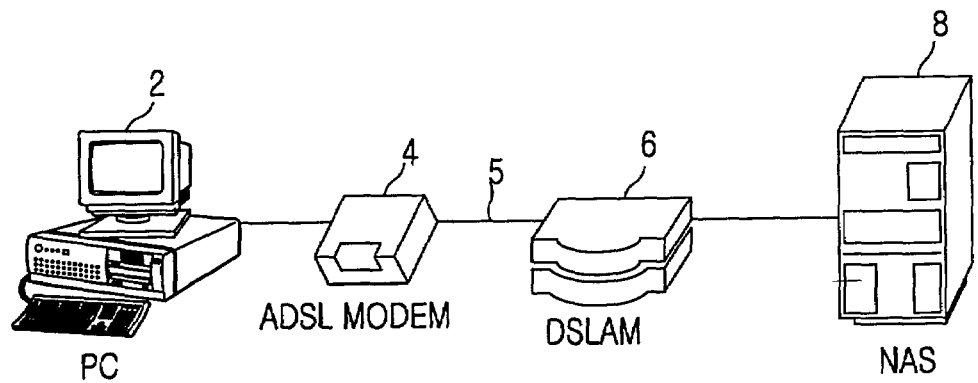
FIG. 1 illustrates a hardware structure for an ADSL service using an internal modem.
Figure 2:
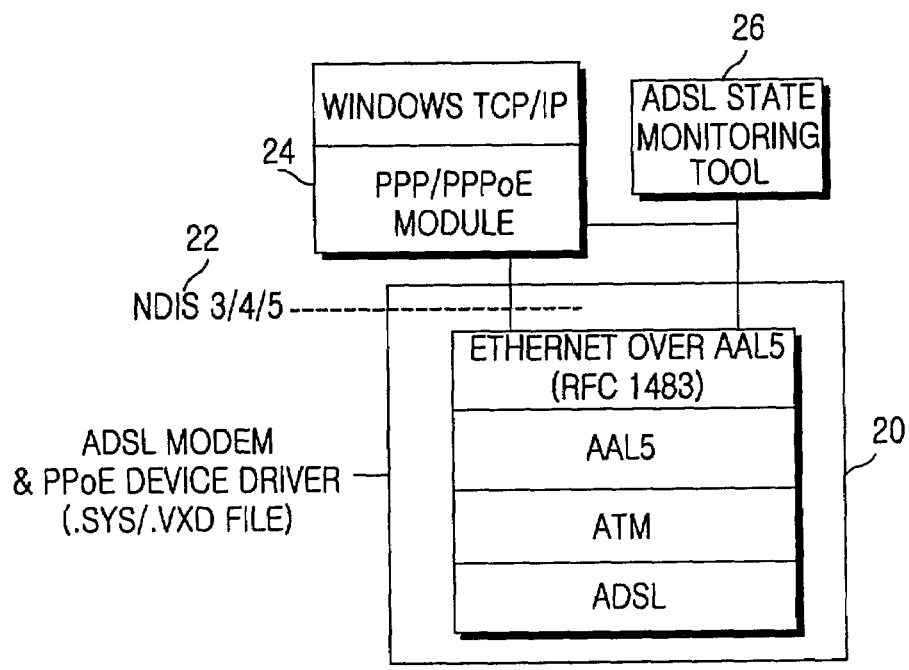
FIG. 2 illustrates a software structure for a subscriber using an improved internal modem according to an embodiment of the present invention.

FIG. 1 illustrates a hardware structure for an ADSL service using an internal modem, and FIG. 2 illustrates a software structure for a subscriber using an improved internal modem according to an embodiment of the present invention. It should be noted herein that PPPoE is used instead of the existing PPPoA. Referring to FIG. 1, an internal ADSL modem 4 is installed in a personal computer (PC) 2, and connected to a DSLAM (DSL Access Multiplexer) 6 through a digital subscriber line (DSL) 5. The DSLAM 6, located in a central office, gathers traffics from the DSL line and transmits the traffics to a backbone of a service provider or the Internet. NAS (Network Attached Storage) 8 is a large-scale file server system not only for directly accessing a back-end network of a server but also for accessing a backbone network of the server. The NAS 8 has an end connected to the DSLAM 6 and another end connected to the Internet.

In order to support the internal ADSL modem 4 installed in the user PC 2, an ADSL modem driver 20 is installed in the user PC 2 as illustrated in FIG. 2. Referring to FIG. 2, the ADSL modem driver 20 according to an embodiment of the present invention supports a multi-layered protocol of ADSL, ATM (Asynchronous Transfer Mode), AAL5 (ATM Adaptation Layer 5), and Ethernet over AAL5, and an upper interface supports NDIS (Network Device Interface Specification) 3, 4 or 5 (reference 22). Further, a PPP/PPPoE module 24 is installed in an upper layer, instead of the existing PPP for WINDOWS™. The PPP/PPPoE module 24 automatically performs Internet access so that the user is not required to access the Internet by running a connection program. In addition, the PPP/PPPoE module 24 informs an ADSL state monitoring tool 26 of a current connection state, so that the ADSL state monitoring tool 26 can inform the user whether the ADSL is currently connected. The ADSL state monitoring tool 26, an application program, receives information on a current line state from the ADSL modem device driver 20 and visually displays the received information for the user. The application program for the ADSL state monitoring tool 26, provided by the internal modem maker, is installed while the device driver 20 is installed. In general, the application program is automatically run when WINDOWS™ (or the user PC 2) is booted. The application is registered in a tray and displays a current state of the ADSL line.

Figure 3:
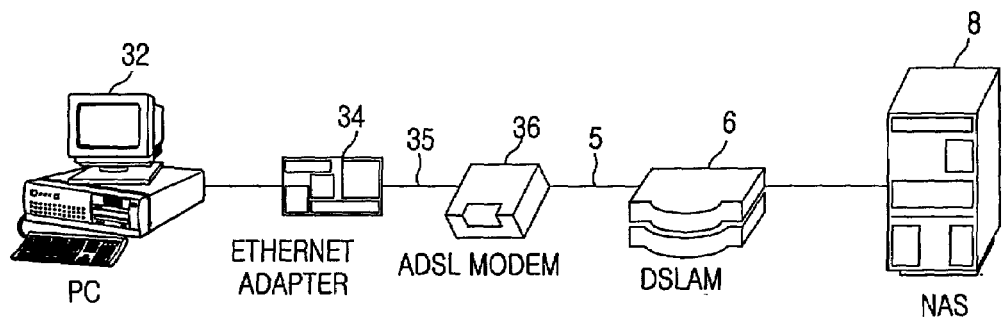
FIG. 3 illustrates a hardware structure for an ADSL service using an external ADSL modem.
Figure 4:
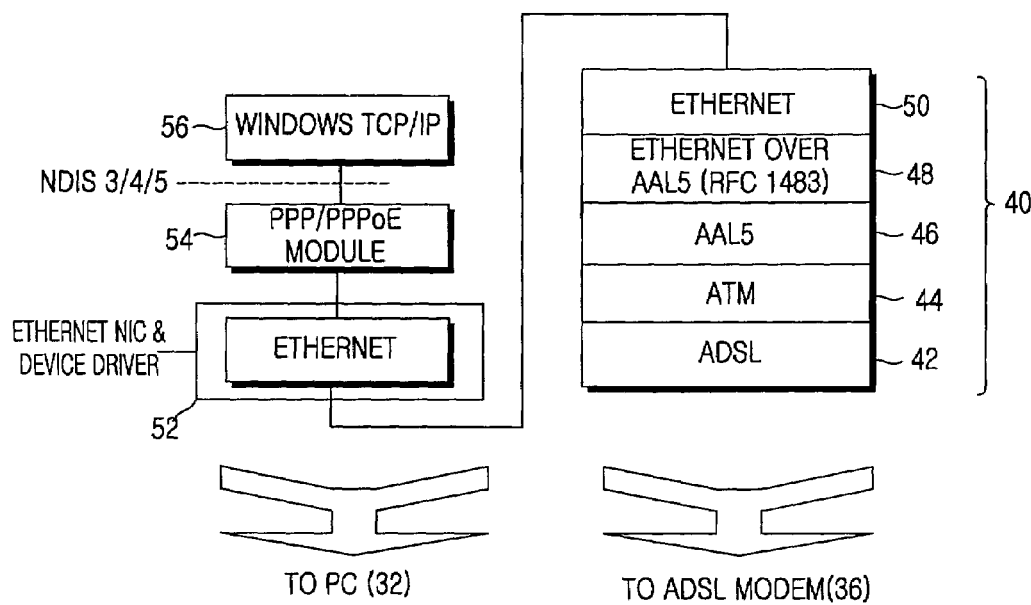
FIG. 4 illustrates a software structure for a subscriber using an improved external ADSL modem according to an embodiment of the present invention.

FIG. 3 illustrates a hardware structure for an ADSL service using an external ADSL modem, and FIG. 4 illustrates a software structure for a subscriber using an improved external ADSL modem according to an embodiment of the present invention. An external ADSL modem 36 illustrated in FIG. 3 is an Ethernet-type ADSL modem. An Ethernet adapter 34 is installed in a user PC 32, and connected to the external modem 36 through an Ethernet cable 35. Communication between the user PC 32 and NAS (Network Access Storage) 8 is performed by PPPoE. The external ADSL modem 36, as illustrated in FIG. 4, has a protocol stack 40 of an ADSL layer 42, an ATM layer 44, an AAL5 layer 46 and an Ethernet layer 50, and performs Ethernet-over-AAL5 layer encapsulation (see RFC 1483) 48 to put the Ethernet layer 50 over the AAL5 layer 46. An Ethernet NIC (Network Interface Card) & device driver 52 is installed in the user PC 32. A PPP/PPPoE module 54 (identical to the PPP/PPPoE module 24 of FIG. 2) according to an embodiment of the present invention is mounted on the Ethernet NIC & device driver 52. The PPP/PPPoE module 54 automatically performs Internet access so that the user is not required to access the Internet by running a connection program. A WINDOWS TCP/IP 56 operates on the PPP/PPPoE module 54.

Figure 14:
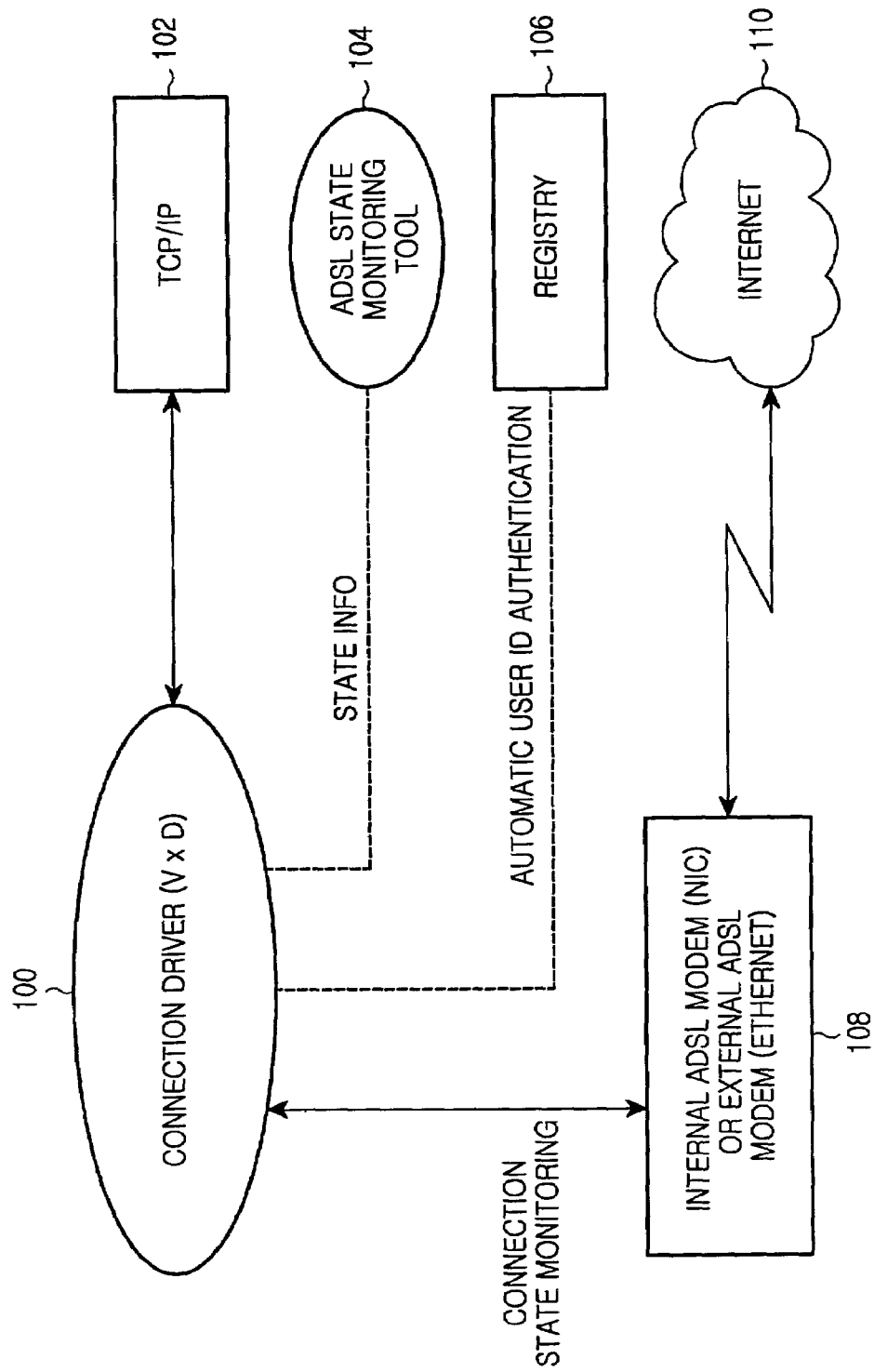
FIG. 14 is a block diagram for performing automatic Internet access according to an embodiment of the present invention.

FIG. 14 is a block diagram for performing automatic Internet access according to an embodiment of the present invention. Referring to FIG. 14, a user PC includes a connection driver 100, a WINDOWS TPC/IP section 102, an ADSL state monitoring tool 104 and a registry 106. The connection driver 100 has the protocol stack 20 of FIG. 2 or the protocol stack 40 of FIG. 4, and controls the ADSL state monitoring tool 104 for state information processing. The ADSL state monitoring tool 104 corresponds to the ADSL state monitoring tool 26 of FIG. 2. The connection driver 100 is connected to the registry 106 and performs automatic user ID authentication. The registry 106 stores user ID and password information input by the user during installation of the driver. In addition, the connection driver 100 monitors a connection state through an internal or external ADSL modem 108 connected to the Internet 110.

In order for a user PC to be provided with an Internet service using the internal ADSL modem 4 or the external ADSL modem 36 illustrated in FIGS. 1 and 3, an automatic Internet access program according to an embodiment of the present invention must be installed in the user PC.

Figure 5:
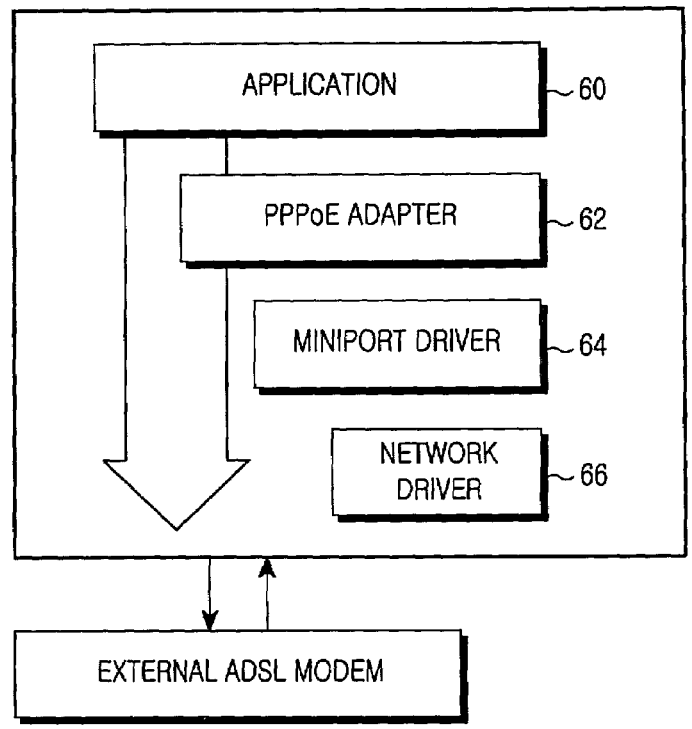
FIG. 5 illustrates a structure of an automatic Internet access program according to an embodiment of the present invention.

As illustrated in FIG. 5, an automatic Internet access program according to an embodiment of the present invention includes a PPPoE Adapter 62, NDISWAN (Network Driver Interface Specification Wide Area Network) Miniport Driver 64, an Application 60 including an Application GUI (Graphic User Interface) 60 and Installation Program 60.

A detailed description of each element of the automatic Internet access program according to the present invention will be given herein below.

First, the PPPoE adapter 62 performs a discovery operation and a PPPoE session operation. Discovery is a step of setting up a PPPoE session between the NAS 8 and the user PC 2. A PPPoE Session is a step of performing user authentication and data transmission/reception (transmission and reception).

Figure 6:
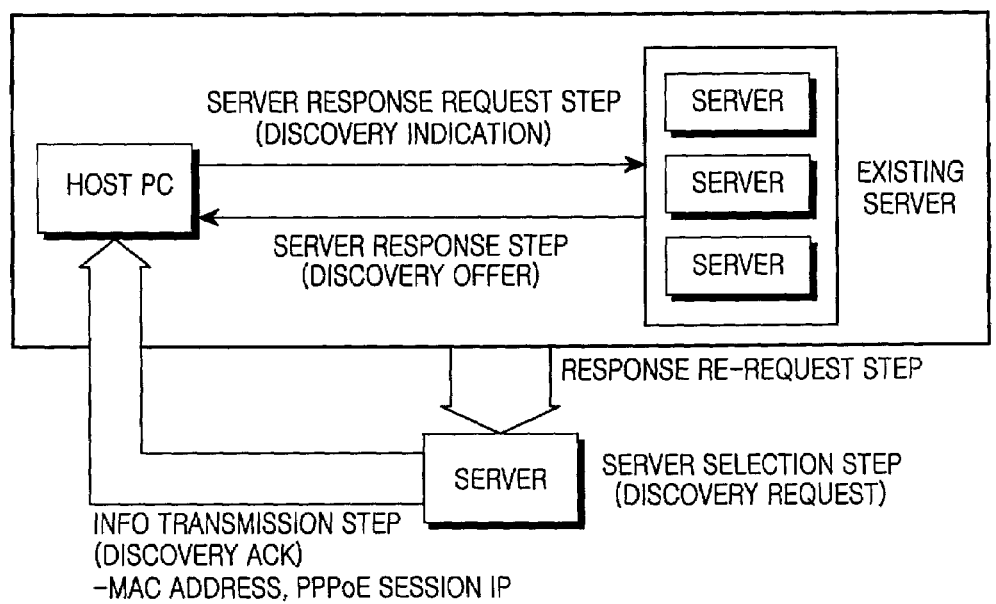
FIG. 6 is a diagram for explaining a discovery operation by a PPPoE adapter according to an embodiment of the present invention.

FIG. 6 is a diagram for explaining the Discovery operation by the PPPoE adapter according to an embodiment of the present invention. The Discovery operation will be described in detail herein below with reference to FIG. 6.

A definition of the Discovery operation by the PPPoE adapter according to an embodiment of the present invention with reference to FIG. 6 includes a step of discovering (searching) a server to which a host PC (or the user PC), serving as a client, performs PPP connection. The operational process of the Discovery by the PPPoE adapter includes: (i) a server response request step by the host PC or user PC (Discovery Indication) where the host (or user) performs broadcasting to discover the server; (ii) a server response step by existing servers (Discovery Offer) where a response is transmitted to a host of the requested server; (iii) a server selection step after response re-request by the host PC or user PC (Discovery Request) where the host selects one server and sends a request to the selected server; and (iv) an information transmission step by the selected server (Discovery Ack) where the selected server transmits a response (Ack) with MAC (Medium Access Control) address and PPPoE session IP information to the host PC.

Figure 7:
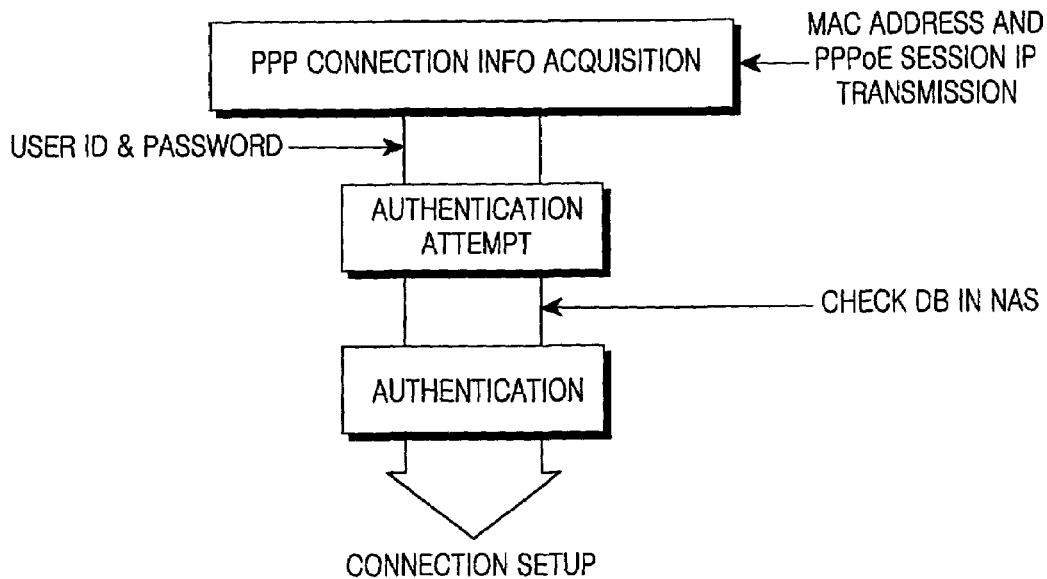
FIG. 7 is a diagram for explaining a PPPoE session operation by the PPPoE adapter according to an embodiment of the present invention.

FIG. 7 is a diagram for explaining the PPPoE Session operation by the PPPoE adapter according to an embodiment of the present invention. The PPPoE Session operation will be described in detail herein below with reference to FIG. 7.

A Definition of the PPPoE Session includes a step of performing user authentication and data transmission/reception. The operational process of the PPPoE Session includes: (i) a PPPoE Session start where acquisition of information is needed for point-to-point connection through Ethernet; (ii) the host attempts authentication to a server connected using a user ID and a password, and performs authentication by checking the DB (database) in the NAS and sets up connection; and (iii) a PPPoE Session end where data transmission/reception (transmission and reception) becomes available.

Next, a method of making the NDISWAN miniport driver in the automatic Internet access program according to an embodiment of the present invention will be described herein below.

Figure 8:
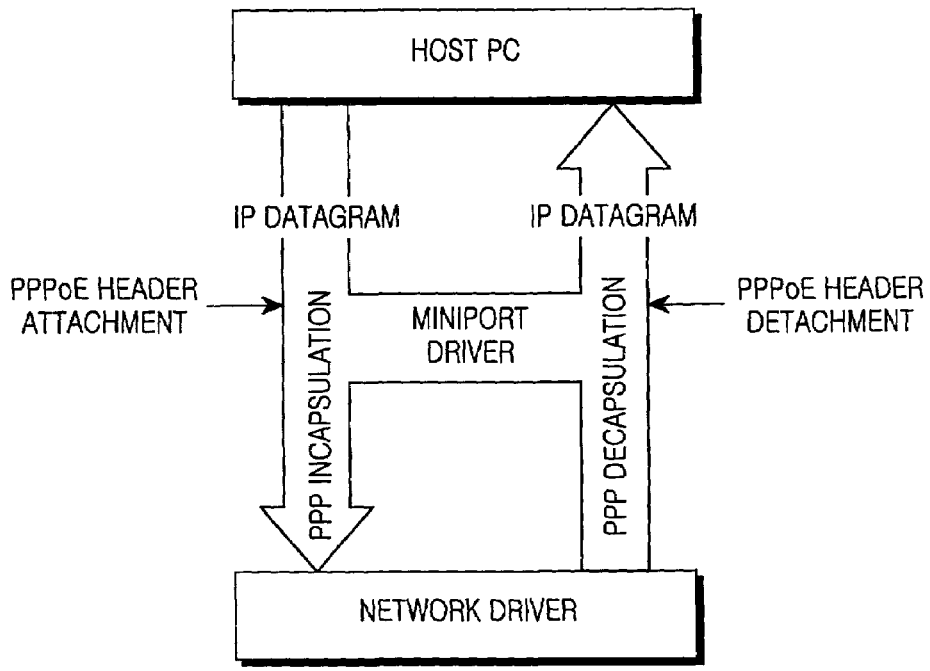
FIG. 8 is a diagram for explaining an operation of a miniport driver.
Figure 9:
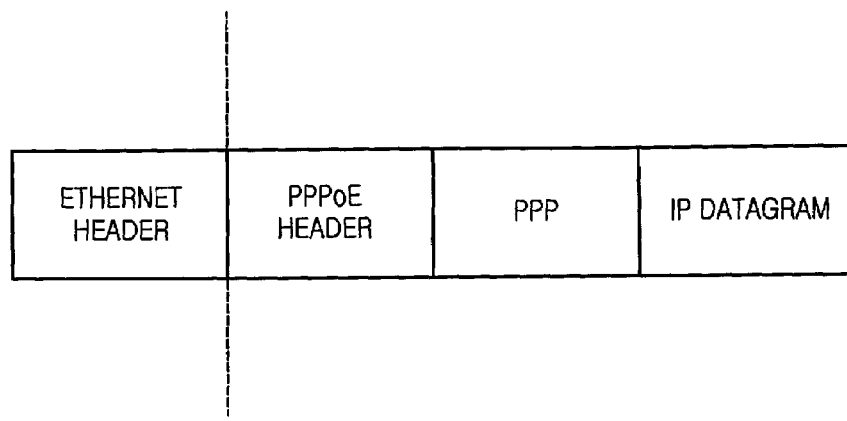
FIG. 9 illustrates a packet frame between a user PC and an ADSL modem.

The miniport driver encapsulates IP datagram with PPP and then attaches a PPPoE header thereto before transmitting a packet to a network driver. Upon receiving a packet from the network driver, the miniport driver decapsulates the received packet into IP datagram. FIG. 8 is a diagram for explaining an operation of the miniport driver. Therefore, the packets exchanged between the user PC and the ADSL modem have a format illustrated in FIG. 9. FIG. 9 illustrates a packet frame between the user PC and the ADSL modem.

Figure 10:
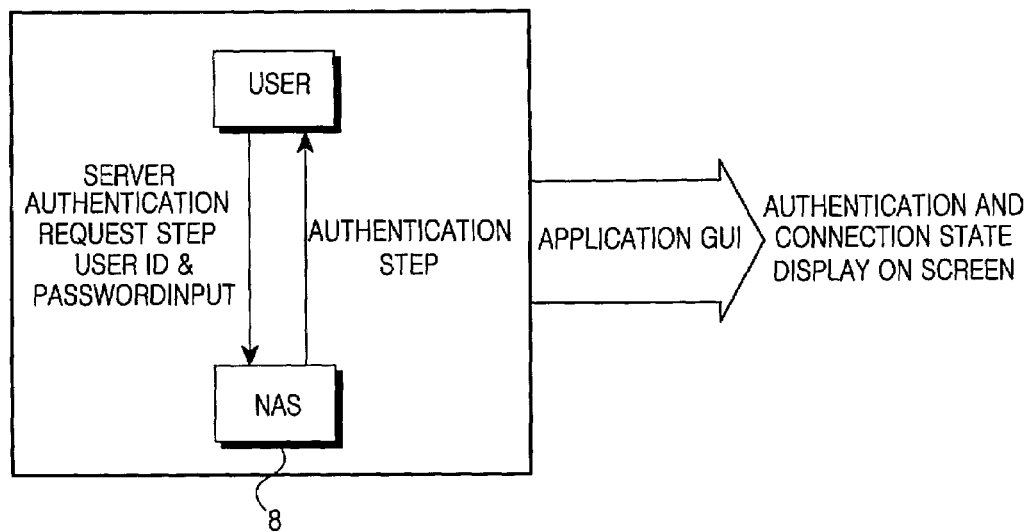
FIG. 10 is a diagram for explaining an operation of an application GUI.

Next, a method of making the application GUI in the automatic Internet access program according to an embodiment of the present invention will be described herein below. FIG. 10 is a diagram for explaining an operation of the application GUI. The application GUI, as illustrated in FIG. 10, receives a user ID and a password input by the user, and displays on a screen an authentication and connection state with the NAS server 8.

Finally, a method of making the installation program in the automatic Internet access program according to an embodiment of the present invention will be described herein below. The installation program has a function of installing the entire program including the PPPoE adapter 62 and the NDISWAN miniport driver 64 in the user PC.

The user can install the automatic Internet access program, the PPPoE adapter 62 and the NDISWAN miniport driver 64 using the installation program after designating a directory. In the directory designated by the user, are installed the automatic Internet access program, the PPPoE adapter and the NDISWAN miniport driver.

Figure 11:
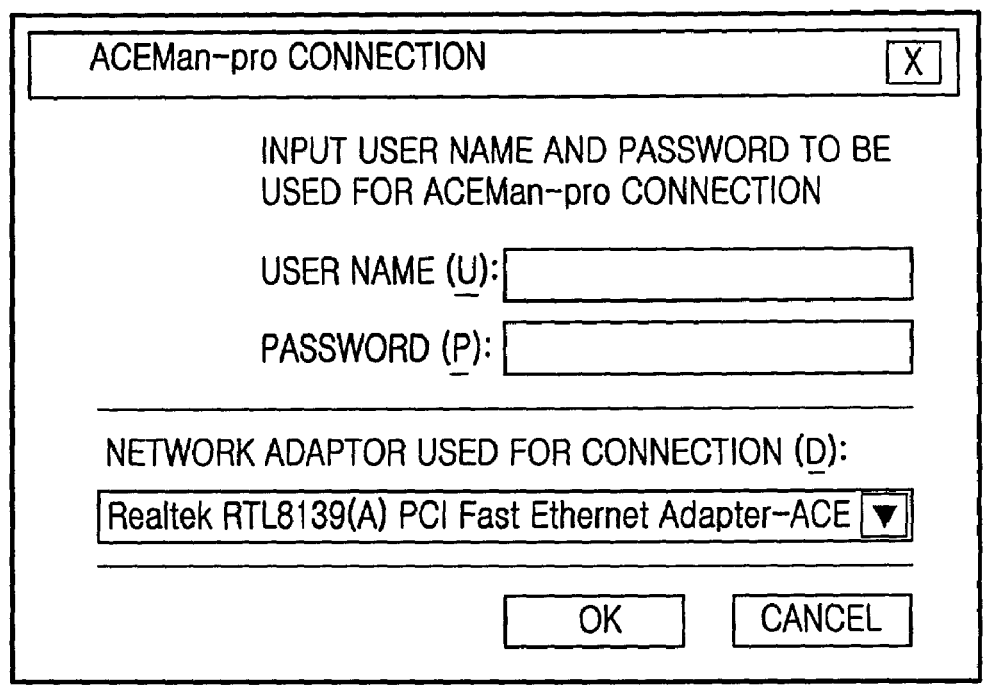
FIG. 11 is a diagram illustrating a window for inputting a user ID and a password while installing a device driver.

In the embodiment of the present invention, when the ADSL modem device driver is installed in the user PC, a user ID and a password are queried. More specifically, if the user PC is rebooted after installation of the automatic Internet access program, the application GUI is performed under the control of the connection driver 100, and a "connection" dialog box for inputting a user ID and a password is displayed on a screen of the user PC as illustrated in FIG. 11. If the user inputs his or her ID and password in a space for a user name and a space for a password, respectively, and then presses an "OK" icon, the connection driver 100 stores the user ID and the password in the registry 106 and then accesses the server through the PPPoE adapter 62, the NDISWAN miniport driver 64, the application GUI 60 and the installation program 60, using the user ID and the password, to attain authentication. When the authentication is attained, the user can access the Internet. The set values can be stored using a Save function or can be read using a Read function. By doing so, the user can select one of the plural Internet services used.

Figure 15:
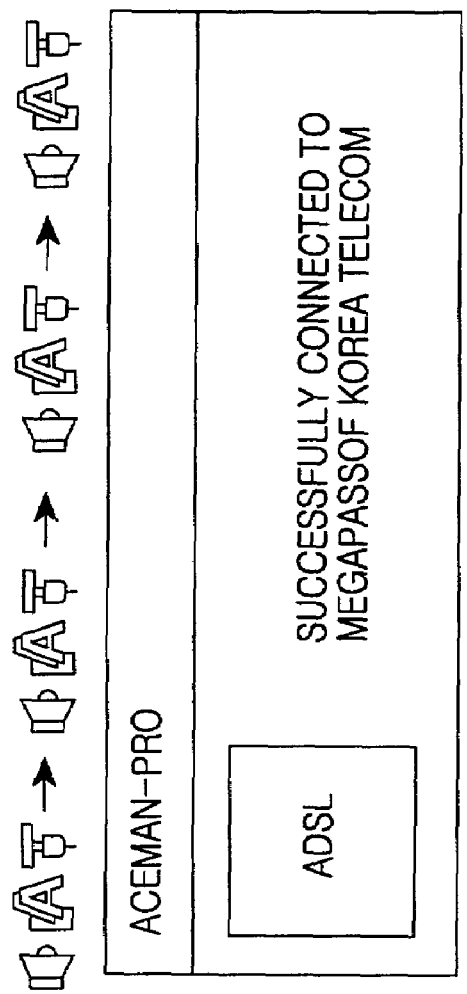
FIG. 15 is a diagram in which while the automatic Internet access program sets up a network environment, a tray icon on the left bottom of the monitor blinks in yellow and green colors, and as the Internet is accessed, a message box indicating the Internet access is displayed.

When the user turns on the PC next time, the PC automatically access the Internet using the user ID and the password previously set (or stored) in the registry 106. While the automatic Internet access program sets up a network environment, a tray icon on the left bottom of the monitor blinks in yellow and green colors, and as the Internet is accessed, a message box indicating the Internet access is displayed as illustrated in FIG. 15.

Figure 12:
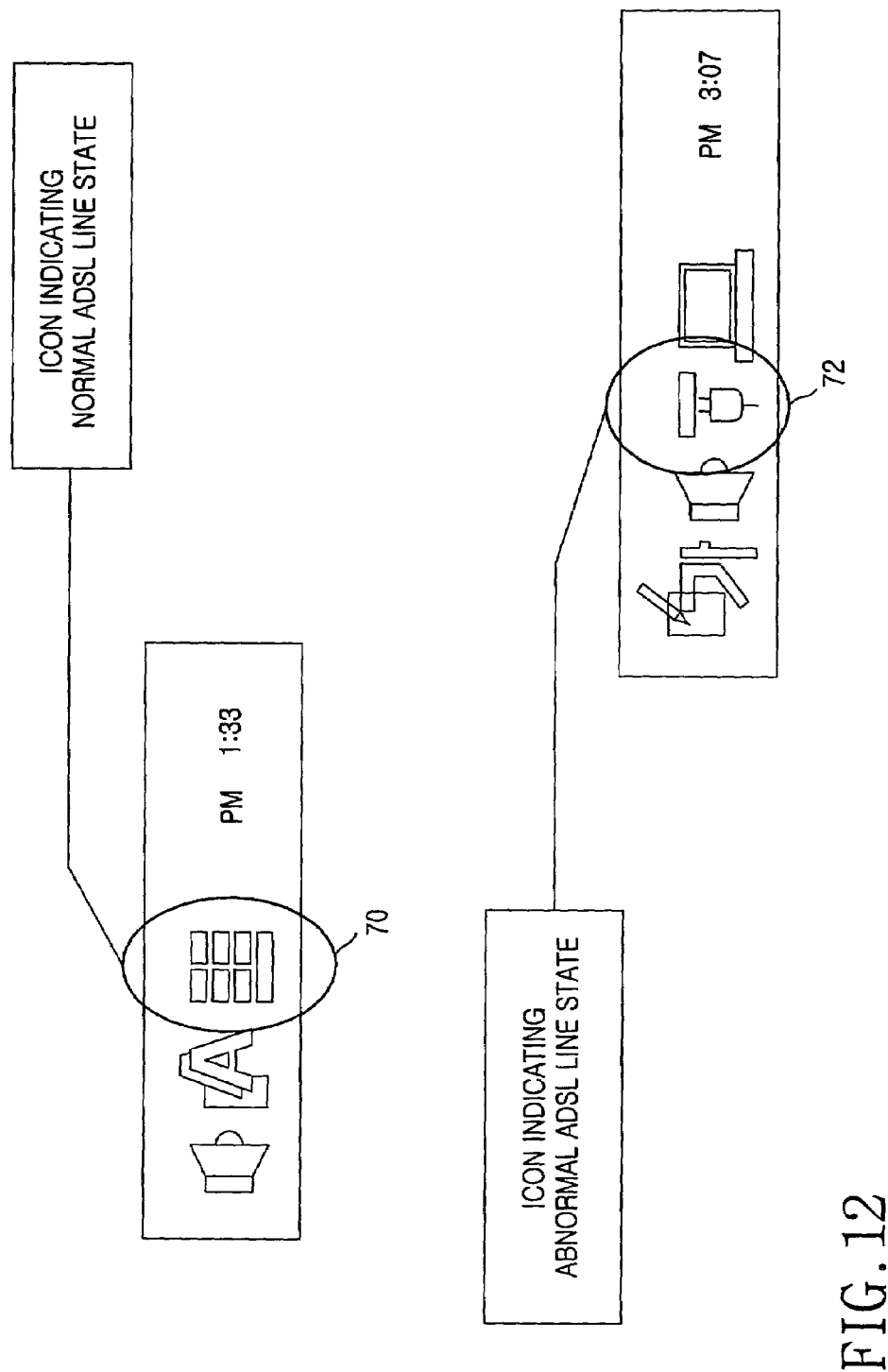
FIG. 12 is a diagram illustrating an ADSL line state after a completed booting of the user PC.

In the embodiment of the present invention, the user, while accessing the Internet, can see the access state through a screen of the user PC. In the embodiment of the present invention, if the Internet access is made, an icon indicating a current connection state is displayed on an operating state display line on a background screen, as illustrated in FIG. 12. Referring to FIG. 12, reference numeral 70 denotes an icon indicating that an ADSL line state is a normal state, and reference numeral 72 denotes an icon indicating that the ADSL line state is an abnormal state. Through the icon, the connection driver 100 can determine the network state. The following are possible network states: a state in which an access to the network is made; a state in which an access to the network is being attempted; a state in which an access to the network is made but no data is transmitted and received; a state in which data is transmitted; a state in which data is received; a state in which data is transmitted and received; a state in which a network access is in a good condition; a state in which a network access is in a bad condition; and a state in which an error has occurred in a network line.

In the embodiment of the present invention, if the ADSL line is in an abnormal state, the Internet access program continuously checks the ADSL line state. As soon as the ADSL line state is recovered, the Internet access program immediately performs automatic access to the Internet (e.g., within 20 seconds and less).

Figure 13:
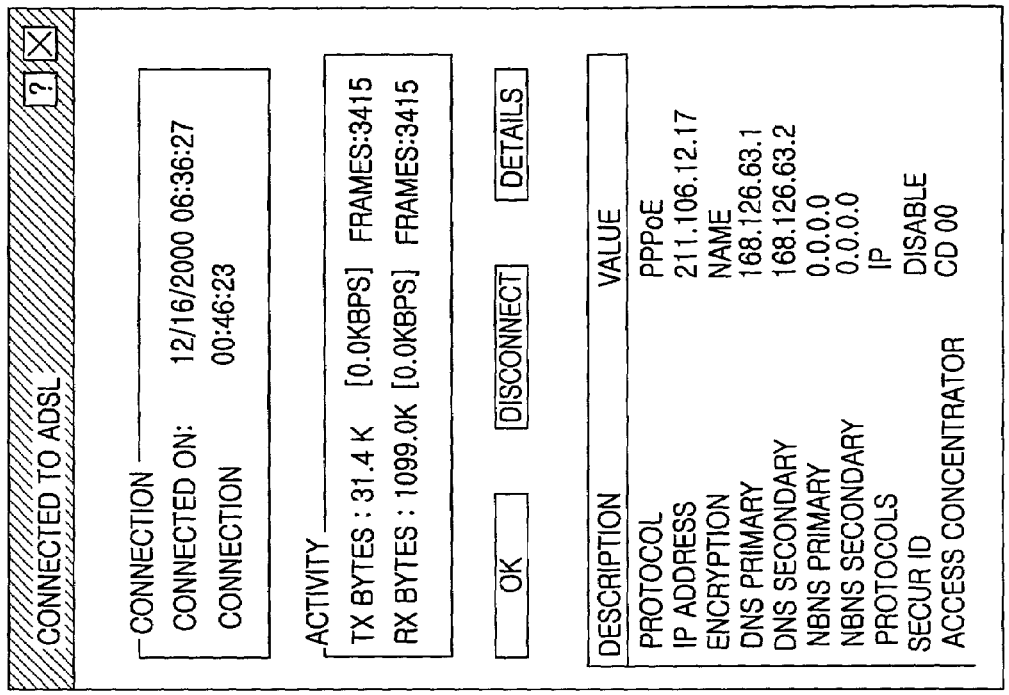
FIG. 13 is a diagram illustrating a general state after the Internet access.
Figure 13:
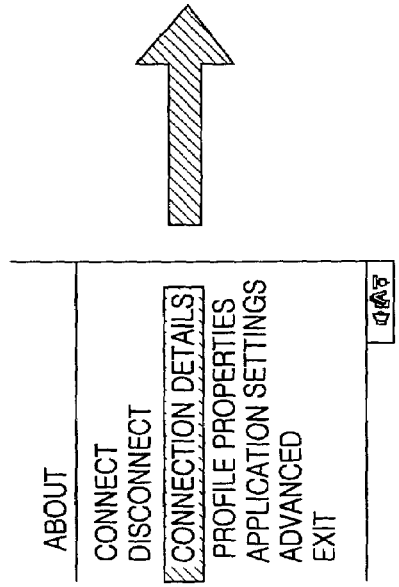

The embodiment of the present invention allows the user to recognize the general state of the connection after the Internet access. FIG. 13 illustrates a window for showing network information. Through the window, the user can see a network connection time, a time lapsed after the connection, the number of transmitted/received bytes, an upload/download rate, and an allocated IP address.

In addition, the embodiment of the present invention supports a function of uninstalling the automatic Internet access program. If the user chooses a Delete icon to uninstall the automatic, Internet access program, the automatic Internet access program including the PPPoE adapter and the NDIS-WAN miniport driver is uninstalled from the user PC. The user PC returns to its previous state in which the automatic Internet access program was installed.

According to the present invention, the user is not required to perform a separate program or a telephone connection adapter in order to access the Internet. Instead, the PC, as it is turned on by the user, automatically accesses the Internet. If the Internet access is disconnected, the PPP/PPPoE module automatically attempts the Internet access. Therefore, unless the ADSL line and the ADSL service are failed, the PC always accesses the Internet.

As described above, the present invention has the following advantages.

First, as the user boots the PC connected to the ADSL, the ADLS connection is previously automatically made, so the user can access the Internet without separately inputting his or her ID and password.

Second, although the Internet access is disconnected due to a system failure or error, if the system failure or error is resolved, ADSL connection is automatically made. In most cases, the ADSL connection is automatically performed, while the user does not recognize the process of reconnection, thereby avoiding interrupting the user. The time that the user cannot temporarily use the Internet is greatly reduced.

Third, the automatic Internet access program according to an embodiment of the present invention makes and maintains the ADSL connection without even an application program. Therefore, although the user mistakenly uninstalls the application program, he or she can still use the Internet. The automatic Internet access program performs the PPP and PPPoE connection protocol by itself, without using a telephone connection program.

Fourth, since the automatic Internet access program serves as a connection driver (VxD) in the popular operating systems of WINDOWS 98, WINDOWS 98SE (second edition) and WINDOWS 95 as well as WINDOWS ME (millennium edition) and other operating systems, it has a simple software structure. In addition, the automatic Internet access program stably operates in all operating systems. Since the automatic Internet access program excludes the use of a complicated installation file, its installation process is very simple.

Fifth, the automatic Internet access program automatically detects a modem connected to the Internet, makes connection and maintains the connection. Even though a plurality of network cards are connected to the PC, the user is not required to manually designate the modem.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An automatic Internet access method using an asynchronous digital subscriber line connected to a personal computer, said personal computer including an asynchronous digital subscriber line (ADSL) modem, a connection driver including an asynchronous digital subscriber line modem device driver, a Transmission Control Protocol/Internet Protocol (TCP/IP) section, an asynchronous digital subscriber line state monitoring tool and a registry for storing a user ID and password, said automatic Internet access method comprising steps of:

connecting said personal computer to Internet via ADSL lines;

installing an automatic Internet access program, said automatic Internet access program including a Point-to-Point Protocol over Ethernet (PPPoE) adapter selecting a server and establishing a direct connection between said personal computer and the selected server by using a PPPoE protocol, and automatically connecting the personal computer to the selected server, a Network Driver Interface Specification Wide Area Network (NDIS-WAN) miniport driver, and an application including an application graphic user interface and installation program;

rebooting said personal computer after the installation of said automatic Internet access program;

running the application graphic user interface under the control of the connection driver and displaying a connection dialog box on a screen of said personal computer for soliciting the user's input of the user ID and password when said personnel computer is rebooted after the installation of automatic Internet access program, said user ID and password are manually input solely by a user;

storing said user ID and password, by said connection driver, into said registry of said personal computer;

attaining authentication by accessing the server through the automatic Internet access program, and by using the user ID and password stored in said registry; and enabling automatic assess to the Internet via said automatic Internet access program, when the authentication is attained.

2. The automatic Internet access method as set forth in claim 1, further comprising steps of:

retrieving the user ID and password stored in said registry each time said personal computer is rebooted; and automatically assessing the Internet via said automatic Internet access program.

3. The automatic Internet access method as set forth in claim 2, the step of automatically assessing the Internet via said automatic Internet access program comprising setting up a network environment via the automatic Internet access program such that a tray icon on a portion of screen blinks in plural colors, and upon attaining automatic access to the Internet, displaying a message box on the screen to indicate that the Internet has been accessed.

4. The automatic Internet access method as set forth in claim 1, wherein said PPPoE adapter performs a PPPoE Discovery operation and a PPPoE Session operation.

5. The automatic Internet access method as set forth in claim 4, wherein said PPPoE Discovery operation searches for said server, and said PPPoE Session operation performs user authentication and data transmission/reception.

6. The automatic Internet access method as set forth in claim 1, wherein said NDISWAN miniport driver encapsulates an Internet Protocol datagram with Point-to-Point Protocol and attaches a PPPoE header thereto before transmitting a packet to said asynchronous digital subscriber line modem device driver, and upon receiving a packet from the asynchronous digital subscriber line modem device driver, decapsulates the received packet into Internet Protocol datagram.

7. The automatic Internet access method as set forth in claim 1, wherein said installation program installs the entire automatic Internet access program including the PPPoE adapter and the NDISWAN miniport driver in a directory designated by a user of said personal computer.

8. The automatic Internet access method as set forth in claim 1, wherein said asynchronous digital subscriber line state monitoring tool continuously checks, via the asynchronous digital subscriber line modem device driver, a state of said asynchronous digital subscriber line to determine whether the asynchronous digital subscriber line is in a normal state or an abnormal state, said automatic Internet access program performing automatic Internet access, when the asynchronous digital subscriber line state monitoring tool determines the asynchronous digital subscriber line has changed from the abnormal state to the normal state.

9. A method of a client automatically accessing a server on the Internet over an asynchronous digital subscriber line, said client including an asynchronous digital subscriber line (ADSL) modem, an asynchronous digital subscriber line modem device driver, a Transmission Control Protocol/Internet Protocol (TCP/IP) section, an asynchronous digital subscriber line state monitoring tool and a registry for storing a user ID and password, said method comprising steps of:

connecting said personal computer to the Internet via ADSL lines;

installing an automatic Internet access program, said automatic Internet access program including a Point-to-Point Protocol over Ethernet (PPPoE) adapter selecting the server and establishing a direct connection between said client and the selected server by using a PPPoE protocol, and automatically connecting said client to the selected server, a Network Driver Interface Specification Wide Area Network (NDISWAN) miniport driver, and an application including an application graphic user interface and installation program;

running the application graphic user interface and displaying a connection dialog box on a screen of said client for inputting the user ID and password in which only a user of the client enters the user ID and password manually when the automatic Internet access program is installed;

storing said user ID and password, by said connection driver, into said registry of the client;

attaining authentication by accessing said server through the automatic Internet access program, and using the user ID and password stored in said registry; and enabling automatic assess the Internet via said automatic Internet access program, when the authentication is attained.

10. The method as set forth in claim 9, further comprising steps of:

searching for said server when said PPPoE adapter performs a PPPoE Discovery operation; and performing user authentication when said PPPoE adapter performs a PPPoE Session operation.

11. The method as set forth in claim 9, further comprising steps of:

utilizing said NDISWAN miniport driver to encapsulate an Internet Protocol datagram with Point-to-Point Protocol and attach a PPPoE header thereto before transmitting a packet to said asynchronous digital subscriber line modem device driver; and upon receiving a packet from the asynchronous digital subscriber line modem device driver, utilizing said NDISWAN miniport driver to decapsulate the received packet into Internet Protocol datagram.

12. The method as set forth in claim 9, further comprising a step of:

utilizing said installation program to install the entire automatic Internet access program, including the PPPoE adapter and the NDISWAN miniport driver, in a directory designated by a user of said client.

13. The method as set forth in claim 9, wherein said asynchronous digital subscriber line state monitoring tool continuously checks, via the asynchronous digital subscriber line modem device driver, a state of said asynchronous digital subscriber line to determine whether the asynchronous digital subscriber line is in a normal state or an abnormal state, said automatic Internet access program automatically connecting said client to said server when the asynchronous digital subscriber line state monitoring tool determines the asynchronous digital subscriber line has changed from the abnormal state to the normal state.

14. The method as set forth in claim 9, wherein said client is a personal computer, said method further comprising steps of:

rebooting said personal computer after installation of automatic Internet access program;

obtaining the user ID and password stored in said registry each time said personal computer is rebooted; and automatically assessing the Internet via said automatic Internet access program.

15. The method as set forth in claim 13, wherein said client is a personal computer, said step of automatically connecting said client to said server, when the asynchronous digital subscriber line state monitoring tool determines the asynchronous digital subscriber line has changed from the abnormal state to the normal state further comprising a step of obtaining the user ID and password stored in said registry, when the asynchronous digital subscriber line state monitoring tool determines the asynchronous digital subscriber line has changed from the abnormal state to the normal state for use in automatically assessing the Internet via said automatic Internet access program.

16. A personal computer connected to a server over the Internet via an asynchronous digital subscriber (ADSL) line, comprising:

an asynchronous digital subscriber line modem, a connection driver including an asynchronous digital subscriber line (ADSL) modem device driver, a Transmission Control Protocol/Internet Protocol (TCP/IP) section, an asynchronous digital subscriber line state monitoring tool and a registry for storing a user ID and password:

a module for storing an automatic Internet access program installed in a user defined directory of the module, said automatic Internet access program including a Point-to-Point Protocol over Ethernet (PPPoE) adapter selecting the server and establishing a direct connection between said personal computer and the selected server by using a PPPoE protocol, and automatically connecting said personal computer to the selected server, a Network Driver Interface Specification Wide Area Network (NDISWAN) miniport driver, and an application including an application graphic user interface and installation program;

said application graphic user interface, under the control of the connection driver, displaying a connection dialog box on a screen of said personal computer in which a user inputs the user ID and password when said personnel computer is rebooted after installation of the automatic Internet access program;

said connection driver storing the input user ID and password;

said automatic Internet access program providing the user ID and password stored in said registry to said server;

said server comparing the stored user ID and password received to a plurality of sets of user IDs and passwords stored in a database and providing user authentication when the stored user ID and password matches one of the plurality of sets of user IDs and passwords stored in the database; and said automatic Internet access program enabling automatic assess to the Internet, when the user authentication is attained from said server.

17. The personal computer as set forth in claim 16, wherein said automatic Internet access program obtains the user ID and password from said registry each time said personal computer is rebooted to enable automatic accesses to the Internet.

18. The personal computer as set forth in claim 16, wherein said PPPoE adapter searches for said server by performing a PPPoE Discovery operation, and performs the user authentication when said PPPoE adapter performs a PPPoE Session operation.

19. The personal computer as set forth in claim 16, wherein said NDISWAN miniport driver encapsulates an Internet Protocol datagram with Point-to-Point Protocol and attaches a PPPoE header thereto before transmitting a packet to said asynchronous digital subscriber line modem device driver, and upon receiving a packet from the asynchronous digital subscriber line modem device driver, decapsulates the received packet into Internet Protocol datagram.

20. The personal computer as set forth in claim 16, further comprising:

said asynchronous digital subscriber line state monitoring tool continuously checks, via the asynchronous digital subscriber line modem device driver, a state of said asynchronous digital subscriber line to determine whether the asynchronous digital subscriber line is in a normal state or an abnormal state;

said automatic Internet access program obtaining the user ID and password stored in said registry, when the asynchronous digital subscriber line state monitoring tool determines the asynchronous digital subscriber line has changed from the abnormal state to the normal state, and automatically connects said client to said serve via the Internet.

* * * * *

UNITED STATES PATENT AND TRADEMARK OFFICE
CERTIFICATE OF CORRECTION

PATENT NO. : 7,647,390 B2  Page 1 of 1
APPLICATION NO. : 10/242402
DATED : January 12, 2010
INVENTOR(S) : Ji et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1334 days.

Signed and Sealed this

Twenty-eighth Day of December, 2010

David J. Kappos
*Director of the United States Patent and Trademark Office*